A. FURMAN.
COLLECTION BASKET.
APPLICATION FILED AUG. 8, 1914.

1,160,273.

Patented Nov. 16, 1915.

Witnesses:
H. S. Bull.
A. A. Olson.

Inventor,
Adalbert Furman,
by Joshua R. H. Potts
his Attorney.

UNITED STATES PATENT OFFICE.

ADALBERT FURMAN, OF CHICAGO, ILLINOIS.

COLLECTION-BASKET.

1,160,273.  Specification of Letters Patent.  Patented Nov. 16, 1915.

Application filed August 8, 1914. Serial No. 855,760.

*To all whom it may concern:*

Be it known that I, ADALBERT FURMAN, a citizen of the United States, and a resident of the city of Chicago, county of Cook, and State of Illinois, have invented certain new and useful Improvements in Collection-Baskets, of which the following is a specification.

My invention relates to improvements in collection baskets such as are used in churches and like places, and has for its object the production of a device of this character from which the coins deposited in the basket may not be removed except when the basket is properly opened.

A further object is the production of a collection basket which will be of durable construction and neat in appearance.

Other objects will appear hereinafter.

The invention consists in the combinations and arrangements of parts hereinafter described and claimed.

Figure 1:
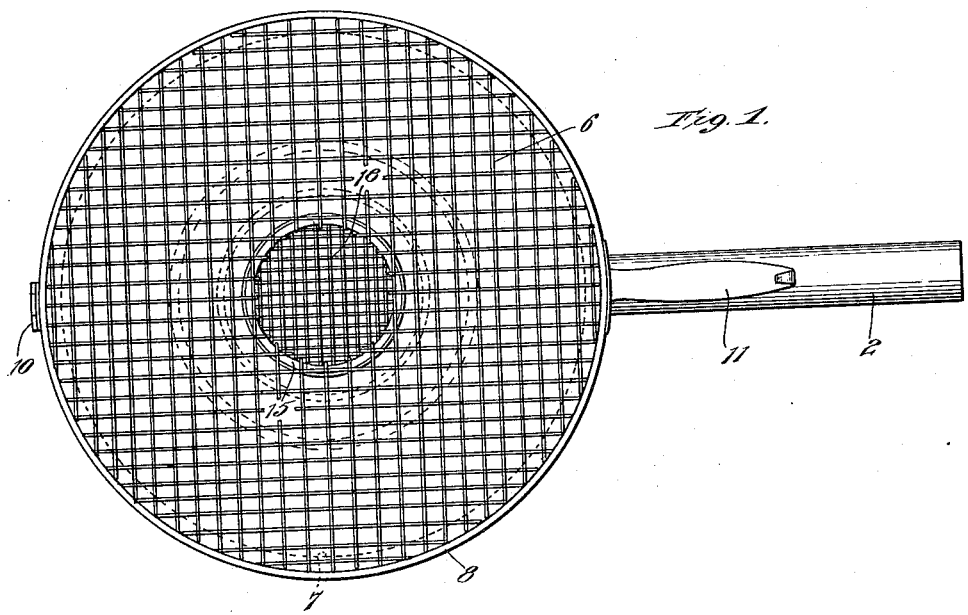
Figure 2:
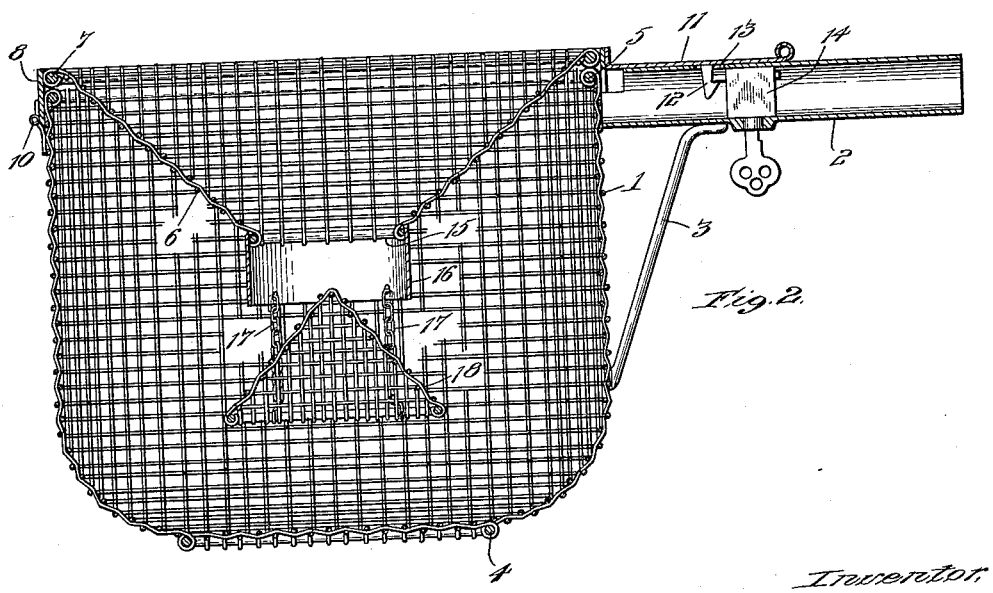

The invention will be best understood by reference to the accompanying drawing forming a part of this specification, and in which, Figure 1 is a top plan view of a collection basket embodying my invention, and Fig. 2 is a central section thereof.

The preferred form of construction as illustrated in the drawing comprises a body or basket 1 provided adjacent its upper edge with a laterally projecting handle socket 2 in which a handle of the length desired is adapted to be inserted. A brace member 3 extends from the basket 1 to the handle socket 2 for reinforcing the latter. Provided at the base of basket 1 is a circular reinforcing wire 4 and provided at the mouth of said basket is a circular reinforcing wire 5.

Arranged at the open upper end of basket 1 is a cover 6 of funnel shape, as shown, which is provided at its periphery with a reinforcing wire 7 and a metallic band 8 secured as by soldering to the periphery of said cover, as shown. One side of cover 6 is hingedly secured to the basket 1 by means of a hinge 10, the opposite edge of said cover being provided with an outwardly projecting hasp or finger piece 11 adapted, when the cover is in closed position, to extend along the handle socket 2 in close proximity with the upper side thereof, as shown in Fig. 2. Projecting from the under side of the hasp 11 is a hooked engaging member 12 adapted for coöperation with a lock 14 of any conventional design, which is mounted in socket 2. Said lock is adapted, when in engagement with the member 12, to lock the cover 6 in closing position, opening of said cover being effected only upon turning of the lock to disengage said member 12. The lock is so arranged that the key slot thereof is positioned at the under side of handle socket 2 so that the presence of a lock in the handle will be unnoticed except upon inversion of the basket.

At the bottom of the funnel-shaped cover 6 is provided the coin admission opening 15 and surrounding said opening is a tubular member 16 secured in position preferably by soldering. Depending from the member 16 are chains 17 which serve to suspend a conical coin deflecting member 18 directly below the coin admission opening and spaced from the member 16 so as to permit of the passage of the coins between the lower edge of the latter and the upper side of said deflecting member.

With the arrangement set forth, it will be seen that the coins deposited into the basket will be guided by the cover, because of the funnel formation thereof, toward the coin admission opening 15, through which the same will drop, being deflected by the member 18 into the interior of the basket. By loosely suspending the coin deflecting member as set forth, upon inversion of the basket, said deflecting member will drop to position against the member 16 so as to close the coin admission opening and prevent the passage of coins therethrough. With this arrangement then, it will be seen, that surreptitious removal of coins from the basket will be prevented, it being impossible to take the same from the basket through inversion of the latter. Hence, with this construction it will be seen that emptying of the basket may be effected only upon turning of the lock 14 to unlock the hasp 11 since, when this is done, the cover may be swung upwardly to open the mouth of the basket.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the class described comprising a receptacle; an admission opening at the upper side of said receptacle; a coin deflecting element arranged below said admission opening; and flexible elements loosely suspending said coin deflecting element from said upper side of the receptacle, substantially as described.

2. A device of the class described comprising a receptacle; an admission opening in the upper wall of said receptacle; a conical coin deflecting element spaced below said admission opening; and flexible elements loosely suspending said coin deflecting element from said upper wall, substantially as described.

3. A device of the class described comprising a receptacle having a funnel-shaped top wall, said top wall having a central admission opening; a coin deflecting element spaced below said admission opening; and flexible elements loosely suspending said coin deflecting element from said upper wall, substantially as described.

4. A device of the class described comprising a receptacle having a funnel-shaped top wall, said top wall having a central admission opening; a conical coin deflecting element spaced below said admission opening; and flexible elements loosely suspending said coin deflecting element from said wall, substantially as described.

In testimony whereof I have signed my name to this specification in the presence of two subscribing witnesses.

ADALBERT FURMAN.

Witnesses:
JOSHUA R. H. POTTS,
HELEN F. LILLIS.

Copies of this patent may be obtained for five cents each, by addressing the "Commissioner of Patents, Washington, D. C."